United States Patent
Twelkemeijer et al.

(10) Patent No.: US 11,557,960 B1
(45) Date of Patent: Jan. 17, 2023

(54) ADAPTIVE ENABLE AND DISABLE FOR VALLEY SWITCHING IN A POWER FACTOR CORRECTION BOOST CONVERTER

(71) Applicant: NXP USA, Inc., Austin, TX (US)

(72) Inventors: Remco Twelkemeijer, Wijchen (NL); Wilhelmus Hinderikus Maria Langeslag, Wijchen (NL); Peter Theodorus Johannes Degen, Arnhem (NL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/491,244

(22) Filed: Sep. 30, 2021

(51) Int. Cl.
   *H02M 1/42* (2007.01)
   *H02M 3/156* (2006.01)
   *H02M 1/08* (2006.01)
   *H02M 3/335* (2006.01)
   *H02M 1/00* (2006.01)

(52) U.S. Cl.
   CPC ....... *H02M 1/4225* (2013.01); *H02M 1/0058* (2021.05); *H02M 1/083* (2013.01); *H02M 3/156* (2013.01); *H02M 3/33569* (2013.01)

(58) Field of Classification Search
   CPC .... H02M 1/0058; H02M 1/083; H02M 3/155; H02M 3/1557; H02M 3/156; H02M 1/42; H02M 1/4225
   See application file for complete search history.

(56) References Cited

U.S. PATENT DOCUMENTS

| | | | |
|---|---|---|---|
| 10,312,799 B1* | 6/2019 | Turchi | H02M 1/38 |
| 10,630,170 B2 | 4/2020 | Kim et al. | |
| 2011/0157940 A1* | 6/2011 | Zhang | H02M 1/4225 363/126 |
| 2017/0012538 A1* | 1/2017 | Barrenscheen | H02M 3/33507 |
| 2018/0083538 A1* | 3/2018 | Kong | H02M 1/44 |

OTHER PUBLICATIONS

Bento, Aluisio A. M. et al. "Reducing Inductor Size and Current Ripple in an AC-AC Converter by Interleaved Switching Strategy", Downloaded on Apr. 24, 2021 from IEEE Xplore, (2006), 7 pgs.

(Continued)

*Primary Examiner* — Gary L Laxton (57) ABSTRACT

Adaptive enabling and disabling is described for valley switching in a power factor correction boost converter. In one example, a boost converter control system includes an amplitude detector to receive an amplitude signal from a boost converter that is related to ringing of the boost converter output. The amplitude detector determines the ringing amplitude. A valley switching controller compares the ringing amplitude to a first high amplitude threshold when valley switching is enabled and generates a valley switching disable signal if the ringing amplitude is below the first high amplitude threshold. A cycle controller coupled to the boost converter generates a drive signal to control switching of the boost converter and coupled to the valley switching controller receives the valley switching disable signal to generate the drive signal without valley switching in response to the valley switching disable signal.

20 Claims, 8 Drawing Sheets

(56) References Cited

OTHER PUBLICATIONS

Cao, Guoen et al. "A Novel Critical-Conduction-Mode Bridgeless Interleaved Boost PFC Rectifier", The 2014 International Power Electronics Conference, (2014), 6 pgs.

Tomioka, Satoshi et al. "Interleaved-Boost-Input Type Isolated Full Bridge PFC Converter", IEEE Peds 2005, Downloaded on Apr. 24, 2021 from IEEE Xplore, 6 pgs.

Balestero, Juan Paulo Robles et al. "Power Factor Correction Boost Converter Based on the Three-State Switching Cell", IEEE Transactions on Industrial Electronics, vol. 59, No. 3, Mar. 2012, 13 pgs.

* cited by examiner

ADAPTIVE ENABLE AND DISABLE FOR VALLEY SWITCHING IN A POWER FACTOR CORRECTION BOOST CONVERTER

BACKGROUND

Electric power conversion is widely used in varied applications including adjustable-speed electric motor drives, switch-mode power supplies, uninterrupted power supplies (UPSs), and battery energy storage. In high-power applications, two or more boost converters are often combined as multiple stages to improve the performance and reduce the size of converter. For high-current applications and voltage step-up, the currents through the solid-state switches are just fractions of the input current. The switches are used to time the power phase of the converter. Power Factor Correction (PFC) converters are used for improved power quality and improved efficiency. Passive PFC may be performed using tuned LC filters, but these may have a limited frequency and power range. Active PFC uses actively controlled solid-state switches in association with passive elements. The switches allow the PFC converter to operate in different modes. A PFC boost converter boosts the input voltage for a higher output voltage.

One of the different modes is discontinuous conduction mode (DCM) in which a PFC converter controller enables the switch after the end of a power cycle. At the end of the power cycle, the voltage on the drain rings due to harmonics in the PFC converter circuit. In DCM, the controller measures a signal that correlates to the drain voltage of the switch and enables the switch at a low point or minimum in the drain voltage ringing. This minimizes switching losses in the converter and improves overall efficiency. This control of the time of switching is referred to as valley switching and zero voltage drain (ZVD) switching. When the controller cannot determine a suitable valley, then a timer is used to limit the maximum time between power cycles.

SUMMARY

A method and apparatus are described for adaptive enabling and disabling for valley switching in a power factor correction boost converter. In one example, a boost converter control system includes an amplitude detector to receive an amplitude signal from a boost converter, the amplitude being related to ringing of the boost converter output, the amplitude detector to determine the ringing amplitude, a valley switching controller coupled to the amplitude detector to receive the ringing amplitude, compare the ringing amplitude to a first high amplitude threshold when valley switching is enabled and to generate a valley switching disable signal if the ringing amplitude is below the first high amplitude threshold, and a cycle controller coupled to the boost converter to generate a drive signal to control switching of the boost converter and coupled to the valley switching controller to receive the valley switching disable signal and to generate the drive signal without valley switching in response to the valley switching disable signal.

In some embodiments, the amplitude signal comprises an inductor current of the boost converter and wherein a valley is defined as a moment when the inductor current is zero. In some embodiments the valley is further defined as a moment a derivative of the inductor current is negative. In some embodiments, the amplitude signal comprises an inductor auxiliary winding voltage of the boost converter and wherein a valley is defined as a minimum of the auxiliary winding voltage. In some embodiments, the amplitude signal comprises an inductor auxiliary winding voltage of the boost converter and wherein a valley is defined as a maximum of the auxiliary winding voltage. In some embodiments, the amplitude signal comprises a voltage of a drain of a switch of the boost converter and wherein a valley is defined as a minimum of the drain voltage.

In some embodiments, the cycle controller is further to set a fixed switching period of the drive signal in discontinuous conduction mode in response to receiving the valley switching disable signal. In some embodiments, the valley switching controller is further to compare the ringing amplitude to a second high amplitude when valley switching is disabled and to generate a valley switching enable signal if the ringing amplitude is above the second high amplitude threshold, wherein the second high threshold is higher than the first high threshold, and wherein the cycle controller is to generate the drive signal with valley switching in response to the valley switching enable signal.

In some embodiments, the valley switching controller is to compare the ringing amplitude to the second high amplitude a fixed number of times and wherein the valley switching circuit is to generate the valley switching enable signal only if the ringing amplitude is above the second high amplitude each of the fixed number of times. In some embodiments, the fixed number of times is four times.

In some embodiments, the valley switching controller is further to determine a period time of the drive signal, compare the period time to a period time threshold and to generate a valley switching disable signal only if the period time exceeds the period time threshold. In some embodiments, the valley switching controller determines the period time of the drive signal based on the amplitude signal.

In some embodiments, the boost converter has a power phase with a primary stroke during which a gate of the converter is enabled and wherein the ringing amplitude is measured after the end of the secondary stroke and before a subsequent primary stroke and wherein a cycle period is related to the time between a primary stroke and a subsequent primary stroke.

In some embodiments, the cycle controller is further to generate a second drive signal to control switching of a second boost converter stage and wherein the cycle controller generates the second drive signal without valley switching in response to the valley switching disable signal. In some embodiments, the converter is operating in a discontinuous conduction mode. In some embodiments, the converter is operating in a boundary conduction mode.

In embodiments, a power factor correction converter includes a boost converter having a switch coupled to a drive signal, an input, and an output, and a boost converter control system having an amplitude detector to receive an amplitude signal from the boost converter, the amplitude being related to ringing of the boost converter output, the amplitude detector to determine the ringing amplitude, a valley switching controller coupled to the amplitude detector to receive the ringing amplitude, compare the ringing amplitude to a first high amplitude threshold when valley switching is enabled and to generate a valley switching disable signal if the ringing amplitude is below the first high amplitude threshold, and a cycle controller coupled to the boost converter to generate the drive signal to control switching of the boost converter and coupled to the valley switching controller to receive the valley switching disable signal and to generate the drive signal without valley switching in response to the valley switching disable signal.

In an embodiments, a method includes receiving an amplitude signal from a boost converter, the amplitude being related to ringing of the boost converter output, determining the ringing amplitude, comparing the ringing amplitude to a first high amplitude threshold when valley switching is enabled and generating a valley switching disable signal if the ringing amplitude is below the first high amplitude threshold, and generating a drive signal to control switching of the boost converter without valley switching in response to the valley switching disable signal.

Some embodiments include setting a fixed switching period of the drive signal in discontinuous conduction mode in response to receiving the valley switching disable signal. Some embodiments include comparing the ringing amplitude to a second high amplitude, generating a valley switching enable signal only if the ringing amplitude is above the second high amplitude, and generating the drive signal with valley switching in response to the valley switching enable signal.

DETAILED DESCRIPTION

It will be readily understood that the components of the embodiments as generally described herein and illustrated in the appended drawings could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

A PFC boost converter has a converter that can be switched on and off to regulate the ON times of the converter power flow. As described herein, the ON time has two dimensions. The first is the duration that a converter is drawing power from the input. In a simple single MOSFET (Metal Oxide Semiconductor Field Effect Transistor) switch converter circuit, this ON time is the time during which the switch or MOSFET gate is ON. The second dimension is the time at which the gate is switched ON. This is directly related to the phase and period of the converter switch.

Figure 1:
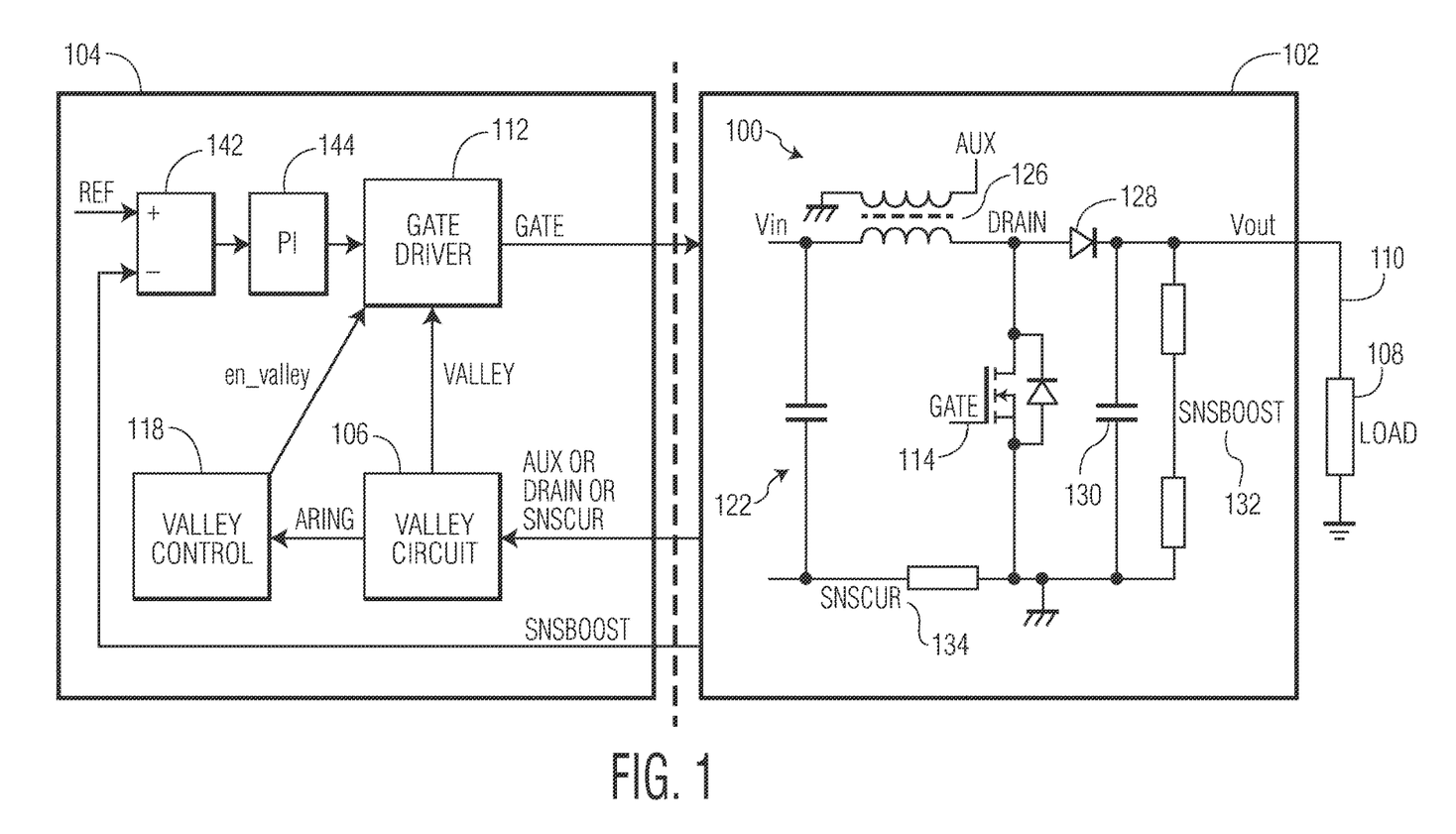
FIG. 1 is a block diagram of a boost power factor correction converter coupled to a controller.

FIG. 1 is a block diagram of a boost power factor correction (PFC) converter and a controller. An application 102 includes a boost converter 100 to produce a power output 110 that is coupled to drive a load 108. The boost converter 100 is controlled by a PFC controller 104 that includes a gate driver 112 to drive a gate of the switch 114 of the boost converter 100. The gate driver 112 is coupled to valley circuit 106 to indicate when to switch the gate of the switch in certain modes. The valley circuit 106 and the gate driver 112 are also coupled to a valley controller 118 to enable and disable valley switching. In the case of a boost converter 100, the PFC controller is a boost converter control system.

The application 102 is shown in a simplified form and includes a filter 122 coupled to a suitable power source such as a direct current (DC) or rectified alternating current (AC) mains power source. The application receives the DC input from the filter 122 and generates a direct current (DC) output 110. The filter 122 is shown in a simplified form and includes one or more filter capacitors and any other suitable components connected across the input voltage, Vin, before the boost converter 100. The particular configuration of the filter circuit may be modified to suit different implementations. The filtered rectified DC output is provided to the boost converter 100 component of the application 102. The boost converter 100 has a PFC coil 126, a switch 114, a diode 128, and an output capacitor 130.

The boost converter 100 receives the rectified input voltage at the PFC coil 126 that is coupled to the drain of the switch 114 and to a series output diode 128. The source of the switch 114 is coupled to the rectified input voltage and to ground. The power output 110 is filtered by the output capacitor 130 that is parallel to the switch and grounded. The switch 114 is in the form of a metal oxide semiconductor field effect transistor (MOSFET), however, other switches may be used for example, GaN or SiC, among others, to suit different loads and input voltages. The boost converter configuration is provided as an example and other converter configurations may be used. The application 102 may include more converters, also referred to as slices. Only one is shown here so as not to obscure other features of the invention. While a DC-DC boost converter is shown. Alternatively, the input power may be AC with a diode bridge rectifier of any of a variety of different types for an AC-DC boost converter.

The gate driver 112 is coupled to the switch 114 of the boost converter 100 to generate a drive signal, GATE, to control the switching of the switch. During the drive signal ON time, the gate of the boost converter 100 is enabled, current flows through the gate, and a power phase starts with a primary stroke as power is drawn from the input and stored in the inductor. During the drive signal OFF time, the gate of the boost converter 100 is not enabled and current does not flow through the gate. This is a secondary stroke of the power phase during which power is drawn from the input and delivered to the output. Also, the energy stored in the inductor is delivered to the output. When the current becomes zero, a ringing phase starts.

The PFC controller 104 receives feedback signals from the application 102. The output voltage 132 is sensed near the application output at a voltage detector. This signal is labeled as SnsBoost for convenience herein. As shown, the voltage is sensed at a voltage divider coupled between the power output 110 and ground. The source current 134 of the boost converter 100 is sensed by a current sensor between the source of the switch 114 and the rectified input voltage across a load. This sensed current represents current to the switch of the boost converter. This signal is labeled as SnsCur for convenience herein. The voltage at the PFC coil 126 may also be measured. This signal is labeled as AUX for convenience. The voltage at the drain of the switch, DRAIN, may also be measured and provided to the PFC controller 104.

The PFC controller 104 uses these feedback signals, SnsBoost, SnsCur, AUX, and DRAIN to drive the switch 114 of the boost converter 100. The gate driver 112 generates a drive signal, labeled as GATE, that is coupled to the gate of the switch 114. The timing and duration of the drive signal controls the operation of the boost converter 100. The gate driver 112 may control multiple converters in which case the timing and duration of the drive signals will also control the relative phase between the multiple converters.

Within the gate driver 112, a differential ON time generation circuit receives an ON time input from an external controller (not shown). With multiple converters (not shown), it also receives a phase control output from a phase control loop (not shown). This information is used to generate an ON time to control the duration during which the boost converter is switched ON. In some embodiments the ON time input is a current or a voltage or a digital value. The ON time is connected to the cycle-by-cycle controller that generates the drive signal with a suitable timing based on the input from the control loops described below. The drive signal has a period and an ON time.

There may be multiple control loops inside the PFC controller. An outer control loop is a voltage control loop that drives the voltage output 132 of the boost converter 100 to a desired value (e.g., 400V). The outer control loop receives the output voltage 132 as SnsBoost from the boost converter 100 and compares the voltage to a reference voltage, Ref, at an outer difference circuit 142 which generates an error signal to indicate the difference. The outer difference circuit 142 is coupled to an outer proportional integrator 144 that receives the error signal. The outer proportional integrator 144 generates an output as a current, voltage or digital value and is coupled to the gate driver to adjust the GATE signal using the SnsBoost feedback signal.

The valley circuit 106 is coupled to the converter 102 to receive one or more feedback signals, such as SnsCur, AUX or DRAIN. The valley circuit detects the amplitude of one or more of these signals to determine when the converter signal output 110 has reached a minimum or valley. At the time of the valley, the valley circuit 106 sends a Valley signal to the gate driver 112. The Valley signal may be used by the gate driver as a time to start the next power phase. In some operational modes, there is no valley switching in which case the Valley signal is not used. In a mode with valley switching, there are multiple valley that may be used. Accordingly, the gate driver will switch in only one of the valleys for each cycle.

A valley controller 118 is coupled to the valley circuit to receive a valley signal, Aring, that represents the amplitude of the ringing signal. The valley controller determines when the amplitude is above or below a threshold and generates a control signal, en_valley, to the gate driver. The gate driver uses this signal to enable or disable valley switching in certain modes. The valley controller causes valley switching to be enabled when the amplitude of the ringing is high enough that power losses from switching in the peaks is significant. The valley controller causes valley switching to be disabled when the amplitude of the ringing is low enough that power losses from switching in peaks is not as significant. The thresholds for enabling and disabling valley switching are chosen in consideration of the power loss or power efficiency and also in consideration of noise immunity. For power efficiency, a low threshold will improve efficiency over time. For noise immunity, a higher threshold ensures that valley switching is used only when the valleys can be clearly detected above the noise. The relative thresholds for enabling and disabling valley switching are discussed in more detail below.

Figure 2:
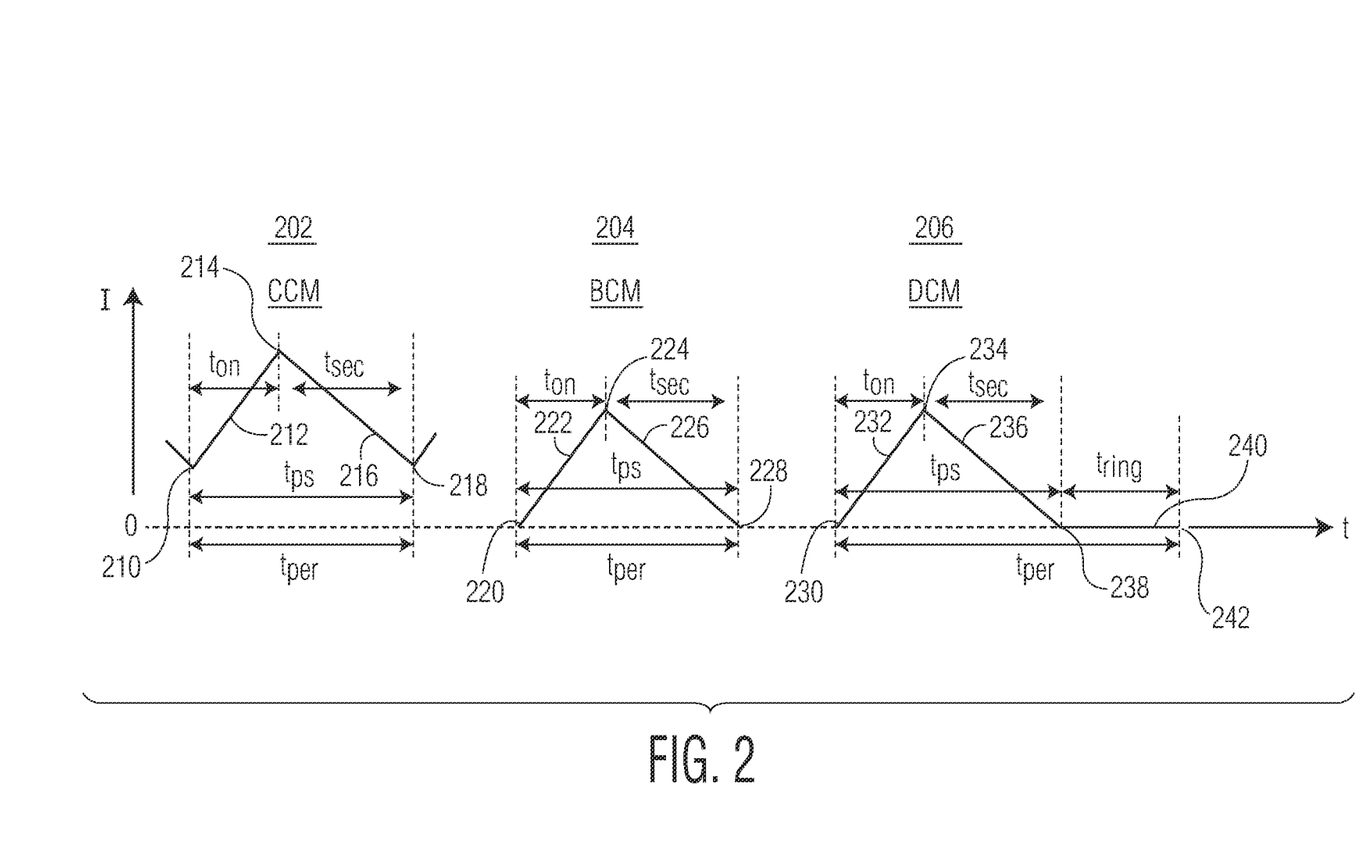
FIG. 2 is a graph of three different operational modes of an interleaved boost converter.

FIG. 2 is a graph of three different operational modes of a PFC converter, for example as in FIG. 1 and variations thereof. The graph shows inductor current of one of the converters on the vertical axis against time on the horizontal axis. The solid-state switches of an interleaved PFC boost converter allow the converter to be operated in different modes. For medium and high-power applications, a CCM (Continuous Conduction Mode) is common. The CCM has a continuous input current which results in low conducted electro-magnetic interference (EMI).

The first mode 202 represents CCM in which the inductor current never reaches zero and so the converter is conducting continuously. At the start of a power phase 210, the inductor current has reached its lowest point and the cycle-by-cycle controller turns the gate of the converter switch to ON. The inductor current increases through a primary stroke 212 reaching a peak at a point 214 corresponding to the transition to a secondary stroke. The duration of the primary stroke is the gate ON time indicated as ton. After the gate is switched off the current declines through the secondary stroke 216 until the end of the period of the power cycle as defined by the primary stroke and the secondary stroke. The end of the second stroke 218 corresponds to the beginning of the next cycle period and the start of the next primary stroke. The cycle period of the switch corresponds to frequency on the order of KHz as compared to the tens of Hertz of an input AC voltage.

If the entire cycle period of the switch is viewed as 360 degrees by analogy to sine waves, 180 degrees is exactly the middle. If two converters are interleaved so that the primary stroke of the second converter starts at the midpoint of the cycle period of the second converter and the point 214 is exactly in the middle, then the input current of the interleaved converter will be approximately a constant current. As the first converter inductor current is decreasing, the second converter inductor current is increasing. The position of the peak at the point 214 is dependent on input voltage and output voltage of the converter at low mains voltages, the peak is closer to the end and at high mains voltages, the peak is closer to the beginning. The output voltage is controlled to a value, the ripple voltage, caused by switching, for example may be further reduced with additional filtering as appropriate.

The second mode 204 is commonly referred to as BCM (Boundary Conduction Mode) or sometimes as CrCM (Critical Conduction Mode). In this mode, the primary and secondary stroke are very similar except that the gate of the converter switch is only turned ON when the inductor current reaches zero. The initial zero crossing 220 is the beginning of the primary stroke 222 of the ON time in the BCM mode 204. At the peak current time 224 the transition is made and the switch is set to OFF. The inductor current decreases during the secondary stroke 226 until a zero crossing 228. The period in BCM mode may be increased by increasing the ON time and thereby increasing duration of the primary stroke and the peak voltage. The secondary stroke will accordingly become longer as well. Increasing the period also increases the inductor current as the current becomes higher during the longer primary stroke. The described controller of FIG. 1 may be used to change the ON time of a primary or master converter to increase or decrease the inductor current and the period. A secondary or slave converter may be matched to that period time or ON duration by adjusting the ON time of both converters, e.g., increasing the ton of one converter while decreasing the ton of the other converter. The timing may be adjusted through a phase detector and a phase controller until the entire period is aligned to be out of phase with the first converter. In some embodiments, the phase between the two interleaved converters is aligned by adjusting only the duration of the switch ON time of both converters. This does not necessarily require adjustments to a ringing phase of the converters.

The third mode 206 is commonly referred to as DCM (Discontinuous Conduction Mode) because the inductor current, or input current, has a dead time interval during which no power is delivered. There is an added delay after the secondary stroke before the next primary stroke. In the DCM mode 206, the first stroke begins at a zero inductor current crossing time 230 with the switch turned ON. The primary stroke 232 extends through a current rise time and a peak inductor current 234 at which the switch ON time is ended and the inductor current falls during the second stroke 236 to a zero inductor current crossing 238. Instead of starting the next period at the end of this power phase, the switch remains off for an additional time 240 during a ringing phase. The end of the ringing phase is the end of the period 242 at which time the next power phase begins with another primary stroke 232 by turning the switch to ON with a drive signal from the cycle-by-cycle converter.

The power phase may be considered as the time during which power is drawn from the input node. The ringing phase is a time during which the inductor current is ringing around zero current due to the inductor value and the capacitance of the physical circuit. The drain voltage of the MOSFET switch rings around the input voltage in this phase. If the amplitude of the drain voltage ringing is below the threshold of the output diode, then no power will reach the output node during the ringing phase.

Figure 3:
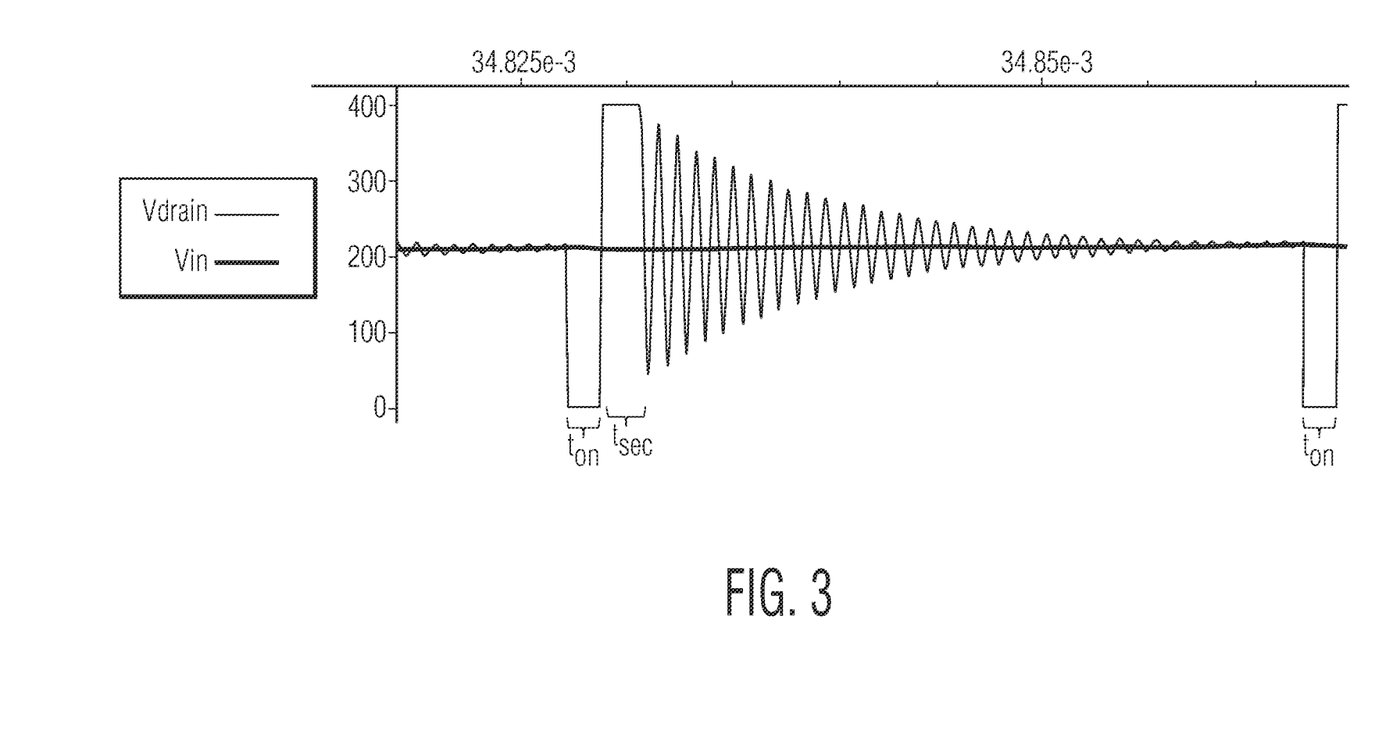
FIG. 3 is a graph of drain voltage against time for an example of a common behavior of a single converter operating in DCM.

FIG. 3 is a graph of drain voltage, DRAIN, against time for an example of a common behavior of a single converter operating in DCM. The drain voltage is the voltage of the drain of the switch of the converter, for example the MOSFET as shown in FIG. 1. The gate of the switch is enabled or ON during a time indicated as ton and shown in FIG. 2. During ton, the primary stroke, the drain voltage is close to 0V. When the gate is disabled or switched OFF, the secondary stroke tsec starts and the drain voltage is approximately equal to the output voltage (400V in this example). When the PFC coil current is zero, all of the energy is transferred and the drain voltage starts to ring due to the parasitic drain-source capacitance of the switch or power transistor and the PFC coil. This is the remaining portion of the graph that is neither ton nor tsec. The amplitude of the ringing is large at the start of the ringing phase and then reduces over time due to the parasitic damping of the drain-source capacitance and the PFC coil.

Based on the graph, an idealized value of the ringing amplitude, ignoring the damping of the ringing and the nonlinear drain source capacitance, may be described using the following two formulas:

$$V\text{amp\_ring} = V\text{out} - V\text{in}\ (V\text{in} > 0.5 V\text{out}) \quad \text{(Eq. 1)}$$

$$V\text{amp\_ring} = V\text{in}\ (V\text{in} < 0.5 V\text{out}) \quad \text{(Eq. 2)}$$

where the Vamp_ring is the amplitude of the ringing of the drain voltage, Vin is the input voltage to the converter and Vout is the output voltage of the converter.

Whenever the switch moves from disabled to enabled, that is from OFF to ON, there are some losses that reduce the efficiency of the converter. The losses are reduced with reduced drain voltage, DRAIN. The switching losses are the least when the switch is enabled at the lowest drain voltage. The relation between the drain voltage and switching loss is that the power loss is proportional to the square of the drain voltage. This may be written as follows:

$$P\text{switch\_loss}\ \alpha\ V\text{drain}^2 \quad \text{(Eq. 3)}$$

As an example, switching to ON at 50V or 350V results by approximation in different switching losses by a factor of 49. Switching at the lowest voltage is called valley switching and is also called Zero Voltage (ZVD) switching. The valley circuit of FIG. 1 is a circuit that may be used to detect the optimal moment to switch.

For low input voltages, Vin, the amplitude of the ringing is higher due to the non-linear drain-source capacitance of the switch, such as a power FET. The capacitance is higher at low input voltages, such as voltages close to zero. Consequently, ringing amplitude is usually large enough that valley switching will improve efficiency. This is the scenario of Equation 2, above. At higher input voltages, as in Equation 1, or due to damping at lower switching frequencies, the amplitude is less and the loss is less. Valley switching is not as important in this case.

As the amplitude of the ringing, Aring, becomes smaller, due to damping or due to a higher input voltage, the valleys are harder to detect. At some amplitude level, a controller, such as a valley circuit, cannot reliably detect the valleys. Under some conditions, the ringing of the drain voltage, or other measure, is partially obscured by noise and other voltages, unlike the idealized curves shown in the drawing figures herein. In some systems, a time-out is used to ensure that the controller continues to generate the gate drive signal and the converter continues to switch even if no valley is detected. The time-out is after the last anticipated valley so that the period of the time-out mode of operation is longer than the valley switching mode of operation. The longer period corresponds to a lower frequency of converter operation which may result in audible noise. In an interleaved PFC, the two converters are configured to switch with a 180 degree phase difference. When the converter frequencies are very low, then it is difficult to ensure the phase relationship. In interleaved converters with a fast inner phase loop to adjust the relative phase of the converters an oscillation may be triggered between the time-out and the mains filter of the application.

When the input voltage of the converter is close to the output voltage, the converter may have irregular switching behavior in DCM and in BCM. This happens when the actual PFC current is not zero at the time of the switch that begins the start of the next power phase. It has been considered that DCM and BCM are defined, at least in part by switching at zero actual PFC current.

When the PFC controller waits until the PFC current is zero before switching, the period of the cycle is extended. When no valley is detected, a PFC converter may wait until the end of a time-out. This also increases the period time. The resulting low switching frequency may cause an oscillation in the mains filter which generates distortion measurable as a low total harmonic distortion (THD) and increases the audible noise. In the case of an interleaved PFC controller where the target is to switch at 180 degrees, the relative phase between the two interleaved converters may become out of control.

Instead of using a time-out when valley cannot be detected. The structure and techniques described herein determine that valleys cannot be detected and then switch to a switching that is independent of valley detection. Valley switching may be controlled using predictions about the controller's ability to detect valleys. In this way the extended period caused by the time-out delay is avoided. Without valley switching the converter may be switched more accurately, and higher frequencies may be maintained. One criterion that may be used to determine whether to enable or disable valley switching is the ringing amplitude, Aring, on the drain voltage. In other embodiments, the source current, the inductor winding voltage or another signal may be used.

Figure 4:
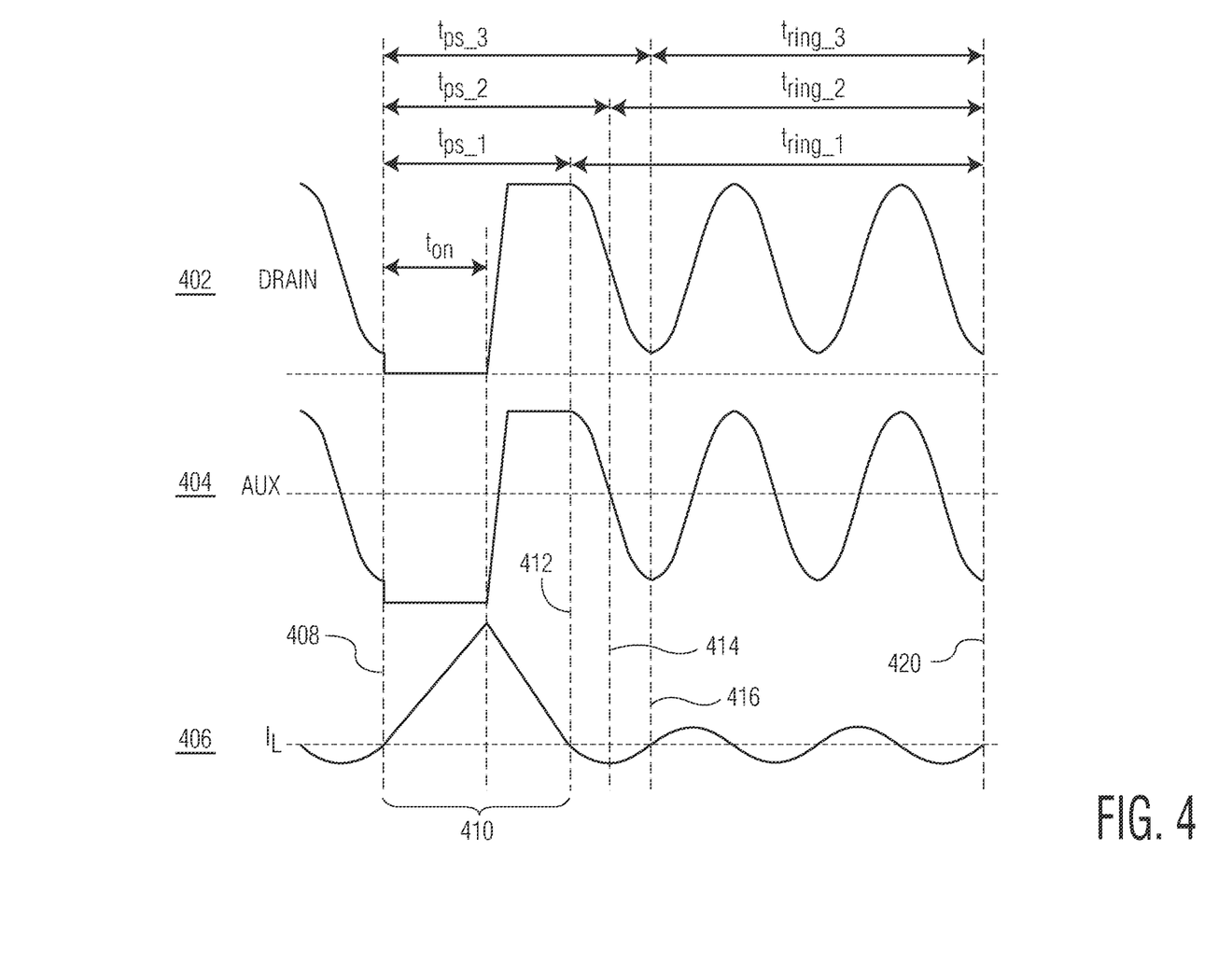
FIG. 4 is a graph of the voltage measured at two different locations on a boost converter and the measured boost converter inductor current.

FIG. 4 is a graph of the voltage measured at two different locations and the measured inductor current to measure the Aring, tps and ton by different definitions. These measurements may be used in the valley circuit and in a valley controller, inter alia, as described in more detail below. At 402, the drain voltage of a gate of a converter is graphed on the vertical axis against time on the horizontal axis. At time 408 a power phase 410 begins with the gate enabled or ON. This instant is used as the start time for ton and for the tps measurement although other times may be used instead. The gate is enabled for a time determined as ton and then it is disabled at a time 408 which is the end of ton. The drain voltage immediately rises. The end of the power phase and of the tps period is also the start of the ringing phase tring in DCM. The end may be measured in different ways. One suitable event is when the drain voltage begins to fall as shown at time 412 and indicated as tps_1. Another suitable event is when the drain voltage goes to the input voltage Vin or when the minimal ringing value (valley) as shown at time 418 and indicated as tps-3.

The voltage of the auxiliary winding of the inductor of a converter is shown as AUX 404. This voltage is similar to that of the drain and the same suitable occurrences apply as with the drain voltage. The shape of the curve is the same as for the drain voltage only the average value of the drain voltage 402 is Vin and the average voltage value of AUX 404 is 0. The zero crossing 416 of the voltage at AUX 404, indicated as tps_2, is a good end time for the power phase. When the inductor auxiliary winding voltage of the converter goes to zero, the zero crossing is easy to detect. The zero crossing is also a local minimum of the inductor auxiliary winding voltage.

At 406 the inductor current is shown on the vertical axis against time. At the time 412 when the power phase 410 ends, the inductor current has a zero crossing. The inductor current goes to zero at this crossing. It then starts ringing and has a second zero crossing 416 at a second later time. This time corresponds to a first valley in the ringing voltage of the drain voltage 402 and the inductor auxiliary winding voltage 404. Any one or more of these events may be used to determine an end time for the power phase, indicated as tps. The valley may be defined using the inductor current as a moment when the inductor current is zero and a derivative of the inductor current is negative. In some implementations, the valley may be declared as the moment when the inductor current is zero. This simplifies detection and implementation.

In DCM, there is a ringing phase and the end of the ringing phase 420 marks the beginning of the next power phase. The interval from the start or rising edge of the first power stroke at 408 and the rising edge of the next power stroke at 420 is one complete switching cycle or a period time of the converter, indicated as the period time, tper, and variations thereon. The gate is then enabled again for another switching cycle. In BCM, there is no ringing phase and the end of the power phase, tps, marks the beginning of the next power phase and the completion of a switching cycle tper. In CCM, there is no ringing phase and the voltage or current may not fall to any particular value. The duration of the ON time is regulated to control the output of the converter and the duration of the power phase which corresponds to the period time, tper.

The relative power difference (ratio) between switching on a valley or switching on a peak is defined by:

$$Rel_{Pdiff} = \frac{(Vin + A_{ring})^2}{(Vin - A_{ring})^2} \quad \text{(Eq. 3)}$$

The amplitude of the ringing, Aring, may be defined in terms of the output voltage:

$$A_{ring} = Vout \cdot x \quad \text{(Eq. 4)}$$

The amplitude of the input voltage, Vin, may also be defined in terms of the output voltage, Vout.

$$Vin = Vout \cdot r_{inout} \quad \text{(Eq. 5)}$$

Equations 3, 4, and 5 may be combined to provide:

$$Rel_{Pdiff} = \frac{(r_{inout} + x \cdot (1 - r_{inout}))^2}{(r_{inout} - x \cdot (1 - r_{inout}))^2} \quad \text{(Eq. 6)}$$

where:

$$x = \frac{A_{ring}}{Vout} \quad \text{(Eq. 7)}$$

and $$r_{inout} = \frac{Vin}{Vout} \quad \text{(Eq. 8)}$$

Considering Equation 6, valley switching affects efficiency more at low input voltages than at high input voltages. The larger the ringing amplitude, Aring, the greater the benefit of valley switching. There are more sources of power loss in the converter than switching losses, such as the gate capacitance of the switch, such as a MOSFET, and root mean square (RMS) losses. These other losses become more significant as the drain voltage losses are reduced. These other losses may be used in selecting the ringing amplitude at which valley switching is disabled. At low ringing amplitudes, other losses may dominate the switching loss.

As shown in FIG. 4, a variety of different measurements may be used to characterize the ringing phase. The amplitude may be measured from the drain voltage, the inductor current, or the inductor voltage, among others. Embodiments herein will be described mostly in the context of measuring the inductor voltage, AUX, but however the structures and techniques may be adapted to other measures. The amplitude of the ringing during the ringing phase is measured via an AUX pin coupled to the inductor. This measurement may be repeated for each converter slice. When using the AUX pin, the average voltage is 0V. When the drain voltage is used, the average voltage is equal to the input voltage. The AC relation between the aux and the drain may be described as follows"

$$V_{aux} = V_{drain} \cdot \frac{N_s}{N_p} = \frac{V_{drain}}{n} \quad \text{(Eq. 9)}$$

where Np/Ns is the turns ratio of the transformer/coil (=n)

Valley switching may be enabled when the ringing voltage amplitude is above a particular pre-selected threshold and disabled when the ringing voltage amplitude is below a particular threshold. In order to reduce the number of changes between enabled and disabled states, two different thresholds may be used with a space or gap between them. The thresholds may be based, at least in part, on the ability of a valley circuit to accurately find a minimum in the ringing waveform. A first limit to this ability is the sensitivity and accuracy of the voltage sensor and related circuitry. A second limit to this ability is the noise and other interference in the system, at some ringing amplitude, the amplitude is so close to the noise that a minimum cannot be clearly distinguished from fluctuations in the noise.

The thresholds may also be based, at least in part, on the relative loss between switching at a valley and a peak as described with respect to Equation 6. When the amplitude is sufficiently low, then there is little or no benefit to valley switching. A threshold for enabling valley switching may be defined in terms of a value for the voltage of the AUX feedback signal, Vaux. In some embodiments, the threshold for enabling valley switching may be set by detecting a voltage, Vaux, higher than a specified minimum amplitude which is defined as a minimum ringing voltage amplitude, Aring min, divided by the turns ratio of the inductor or PFC coil, n, as follows:

$$V_{aux} > \frac{A_{ring\_}\min}{n} \quad \text{(Eq. 10)}$$

During the ringing phase of the converter, the feedback signal is ringing around Vin for the drain voltage and around zero for the AUX. As the ringing amplitude is damped, the characteristics of the signal are difficult to clearly measure. The shape of the ringing waveform is well understood and generally resemble that of FIG. 3. Rather than determine whether to enable or disable valley switching at each ringing cycle, performance is improved by making such a determination at most once per cycle. In some embodiments, the determination is made only after a predetermined number of cycles or after a time delay. To make the determination after a predetermined number of cycles, the controller may also detect the start of each new ringing cycle. This can be done, for example, using a comparator for the same drain voltage or AUX signal that is set close to 0V, e.g., 100 mV.

$$V_{aux}=100 \text{ mV} \approx 0V \quad \text{(Eq. 11)}$$

While an AUX voltage close to zero indicates a new ringing cycle, the measurement is subject to noise, especially at low voltages. An additional requirement may be used for a two-stage test to determine whether a new ringing cycle has occurred. One such test is whether the AUX voltage is very high. Accordingly, a 0 or very low voltage followed by a high voltage may be used to indicate a new ringing cycle. Different thresholds for a high voltage may be used. In some embodiments, a voltage one half the valley switching threshold of Equation 10 is used. Other thresholds may be used instead. This may be defined as follows:

$$V_{aux} > \frac{A_{ring\_}\min}{2 \cdot n} \quad \text{(Eq. 12)}$$

Summarizing, the three voltage tests may each form the basis for a comparator indicated by Equations 13, 14, and 15, respectively. The three comparison signals Vdemaghigh, Vdemagmed, and Vdemaglow may be analyzed in logic as described in more detail below to generate, two demag signals, demag_lh (large hysteresis) and demag_sh (small hysteresis). These signals may be used to detect the ringing amplitude using the AUX voltage. The three comparators may be defined as follows:

$$V_{demaghigh} = \frac{A_{ring\_}\min}{n} \quad \text{(Eq. 13)}$$

$$V_{demagmed} = \frac{V_{demaghigh}}{2} \quad \text{(Eq. 14)}$$

$$V_{demaglow} = 100 \text{ mV} \approx 0 \text{ V} \quad \text{(Eq. 15)}$$

Figure 5:
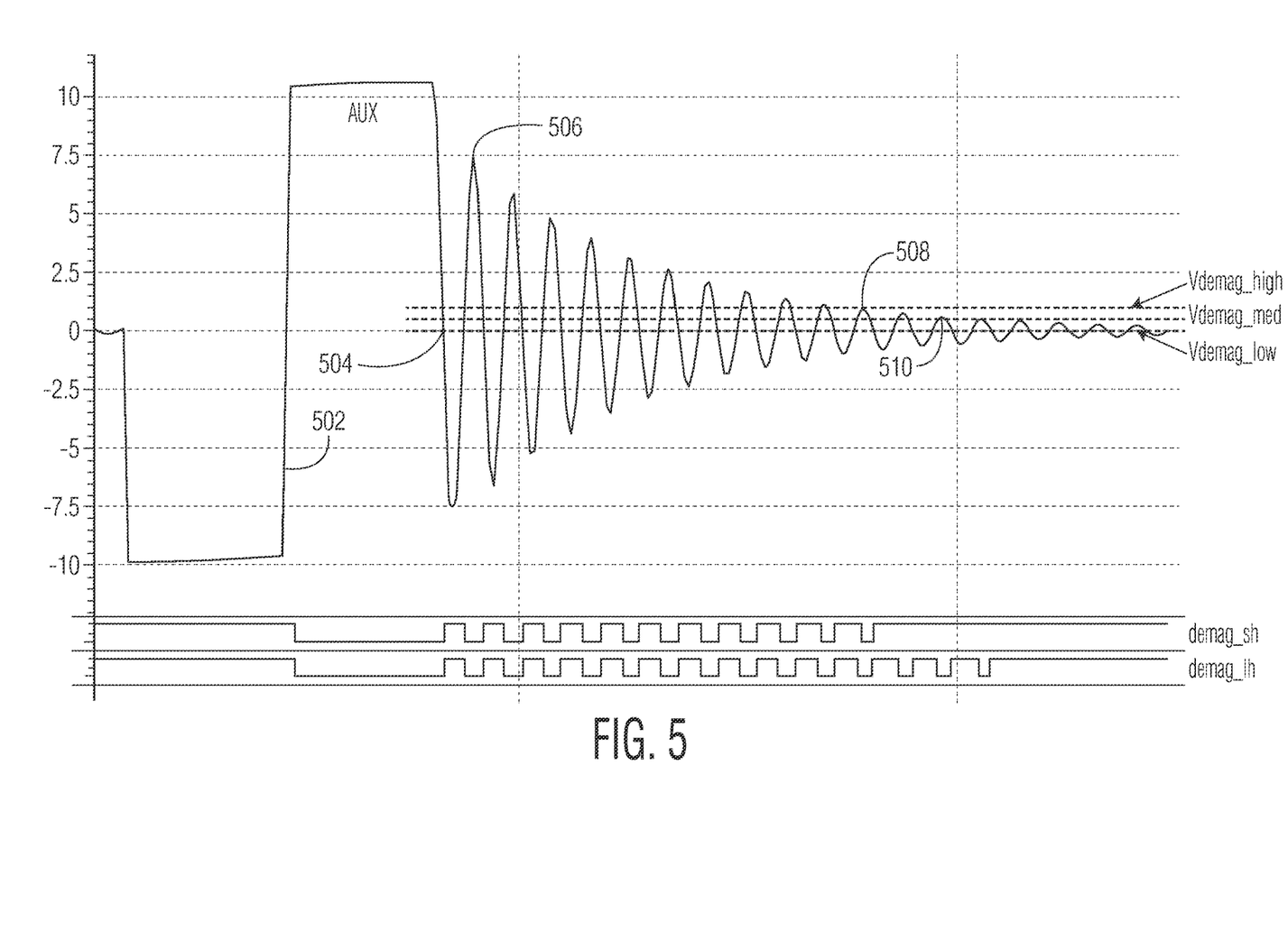
FIG. 5 is a diagram of voltage amplitude of inductor current against thresholds as described herein.

FIG. 5 is a diagram of the 5 signals. The upper waveform is a representation of the voltage amplitude of the AUX signal on the vertical axis versus time. The voltage waveform 502 has a zero crossing at time 504 at the start of the ringing phase. The zero crossing is measured against the first lowest threshold indicated as Vdemaglow. The first positive swing of the voltage at time 506 is clearly greater than the second threshold, Vdemagmed, and the controller can now determine the start of a new ringing cycle. The ringing phase continues and is subject to damping as indicated by the decreasing amplitude with each cycle. At a later time 508, the amplitude is below the first threshold, Vdemaghigh, and later at time 510 is also below the second threshold, Vdemagmed.

The lower waveforms show the two demag signals, demag_lh and demag_sh, that are derived from the three thresholds as low or high and aligned on the time axis with the AUX waveform 502 and the thresholds. As shown the shorter hysteresis signal goes to a steady high at time 508. At this time, if no valley switching has occurred, then valley switching is disabled and the period ends at an appropriate time determined in a separate power feedback loop. The long hysteresis signal goes to a steady high at time 510. If still no switching has occurred then a new period time is set for the period time of the controller.

The three demag thresholds, Vdemaglow, Vdemagmed, and Vdemaghigh, are tested every cycle period and every oscillation cycle of, e.g., the drain voltage, during the ringing time. The oscillation amplitude is compared to these thresholds not only the first oscillation after the secondary stroke, but for every over oscillation until the converter switches on to begin the next power cycle.

Figure 6:
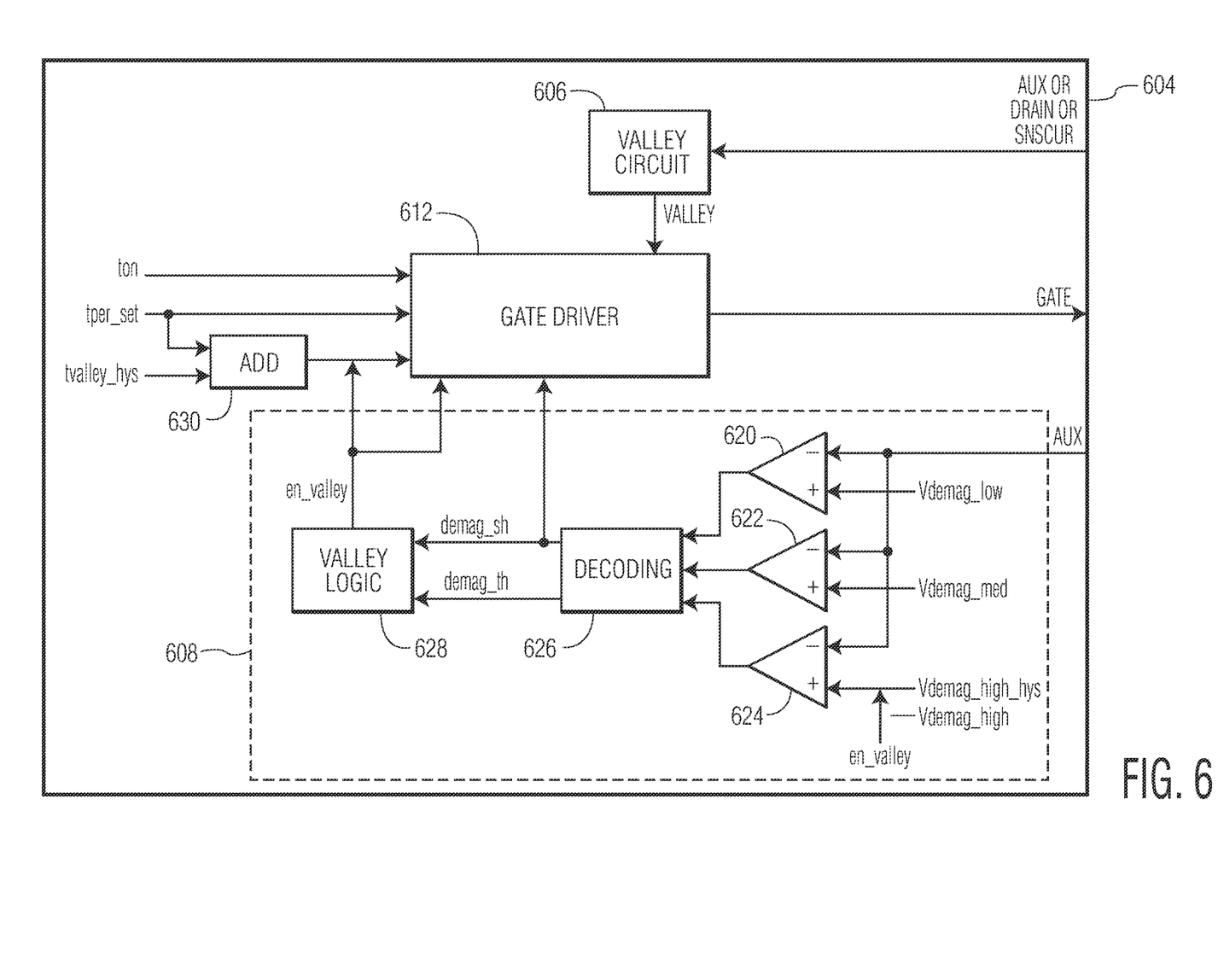
FIG. 6 is a block diagram of a portion of an alternative PFC controller showing a valley controller and related components.

FIG. 6 is a block diagram of a portion of an alternative PFC controller showing a valley controller and related components. The portion of the PFC controller 604 is coupled to a boost converter through a gate drive output and feedback signals. The feedback signals may be any one or more of the AUX, DRAIN voltage, or SnsCur among others. One or more of these signals is applied to a valley circuit 606 which determines the valleys in the boost converter and sends a valley signal to a gate driver 612. The valley circuit may operate using any one or more of a variety of different structures and techniques and using any suitable feedback circuit. The gate driver 612 uses this and other inputs to generate a gate drive output, GATE, to control the switch of the converter. A valley controller 608 generates a valley switching enable signal, en_valley, to control whether valley switching is enabled or disabled at the gate driver 612.

The valley controller 608 receives a feedback signal, the AUX in the illustrated example, and applies it to three comparators which are based on Equations 13, 14 and 15 as described above. The feedback signal is related to the ringing amplitude of the converter directly or indirectly. The AUX is proportional to the ringing amplitude. The low threshold comparator 620 compares the ringing amplitude to a low threshold, Vdemag_low, which is zero or close to zero in the case of the AUX signal. The output of the low threshold comparator is a positive or negative signal that is sent as an input to decoding logic 626.

The medium threshold comparator 622 compares the ringing amplitude to a medium threshold, Vdemag_med, to determine a cycle of the converter. The medium threshold comparator 622 generates an output that is sent as a second input to the decoder. The low threshold being met followed by the medium threshold being met may be used together to determine the start of a new ringing cycle. Any of a variety of other structures and techniques may be used to determine a start of new ringing cycle. In some embodiments a signal from the gate driver is used to determine when a power phase starts or ends.

A high threshold comparator 624 compares the ringing amplitude to a high threshold. When the high threshold is met, then the high threshold comparator generates an output that is sent as an input to the comparator. When the high threshold is met or not met after the start of a new ringing cycle, then the valley switching may be enabled or disabled. The three signals from the three comparators are each sent to the decoding logic 626 which interprets the three input signals.

In some embodiments, after the start of a new ringing cycle, as indicated by the low threshold comparator 620 and the medium threshold comparator 622, if the ringing amplitude is above the high threshold as indicated by the high threshold comparator 624, then valley switching is enabled using a high state of a valley switching signal, en_valley. Similarly, if the ringing amplitude is below the high threshold, then valley switching is disabled. In some embodiments, two high thresholds may be used to provide hysteresis in the control loop. As shown, the high threshold comparator has a first high threshold, Vdemag_high, that is used when valley switching is enabled. Valley switching is disables when the ringing amplitude is below the threshold. A second higher threshold, Vdemag_high_hys, is used when valley switching disabled. Valley switching is enabled when the ringing amplitude is above the higher threshold. This is represented in FIG. 6 as a switch between the two thresholds that is activated by the valley switching signal.

The decoding logic 626 of the valley controller 608 receives the three comparator outputs as inputs and generates output signals, demag_sh, and demag_lh. The demag_sh signal is sent as an input to the gate driver 612. This avoids the theoretical need for time-out logic. However, timeout logic may also be implemented for extra safety.

In addition to controlling the valley switching state as enabled or disabled, the PFC controller 604 may optionally also control the period time for the boost converter. The gate driver 612 receives a ton signal which affects when the gate driver opens the switch of the converter. The gate driver 612 further receives a desired period signal, tper_set, which affects the duration of the cycle period of the converter. These inputs may be determined in any of a variety of different ways. When valley switching is enabled, by the en_valley signal, the voltage on the high threshold comparator 624 is set to Vdemag_high and the requested period time is equal to tper_set.

Valley switching is reactivated, from a disabled state, when the high threshold comparator determines that the ringing amplitude is greater than the higher high threshold labeled as Vdemag_high_hys. An additional safety mechanism may be added by increasing the period time when valley switching is disabled. An adder 630 receives the desired period time, tper_set, and an additional time, labeled as tvalley_hys, which is added to the desired period time, tper_set in the adder. The sum is coupled to a switch that is controlled by the valley switching signal, en_valley. When valley switching is enabled, tper_set is provided to the gate driver 612. When valley switching is disabled, then the switch provides the longer period time to the gate driver 612 from the adder 630. When valley switching is activated again the period time becomes smaller, because the additional time, tvalley_hys is no longer added to the period. This shorter period reduces a risk that the ringing amplitude is too small after reactivating valley switching due to the damping of the ringing amplitude. The additional time, tvalley_hys, may be set to any of a variety of suitable values. In some embodiments, this hysteresis is two times the oscillation of the ringing signal.

Figure 7:
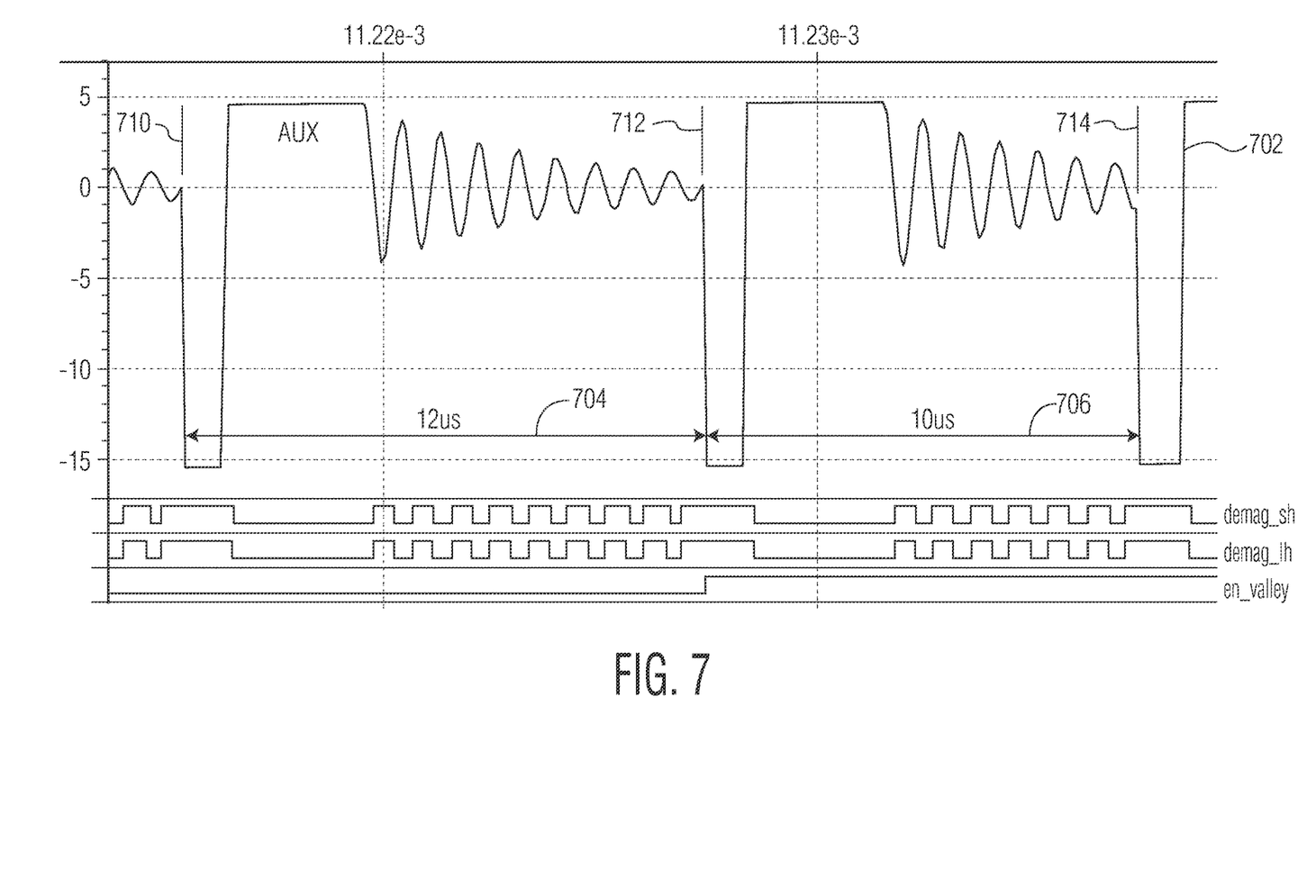
FIG. 7 is a graph of a simulation of the AUX signal as voltage on the vertical axis versus time.

FIG. 7 is a graph of a simulation of the AUX signal as voltage on the vertical axis versus time. The first period 704 of the AUX signal 702 has a duration from a start of a power phase at time 710 to the start of a second power phase at time

712. The first period has valley switching disabled as shown with the en_valley signal which is aligned on the same time axis. The second period 706 starts at the start of the second power phase at time 712 and has a duration until the start of the third power phase at time 714. The second period 706 has valley switching enabled. As shown the first period 704 has a 12 μs duration and the second time period 706 has a shorter 10 μs duration.

A further enhancement in some embodiments is to use a counter in the valley control logic 628. Rather than change the state of the valley switching signal, en_valley, the counter counts some number of cycles before changing the valley switching state. As an example, four successive cycles in which the ringing amplitude is higher than the high threshold may be counted before the valley logic changes the state to enable valley switching. Similarly, four successive cycles in which the ringing amplitude is below the high threshold may be counted before the valley logic changes the state to disable valley switching. By requiring 4 repetitive cycles of passing the threshold, false detection for enabling or disabling the valley detection or both is avoided. The switching behavior is corrected in view of spurious signals and noise. A different number other than 4 may be used and the count may be applied only to one or the other of the state changes. The counting may be performed with a single high threshold or it may be combined with the two high threshold, Vdemag_high, Vdemag_high_hys, discussed above.

Figure 8:
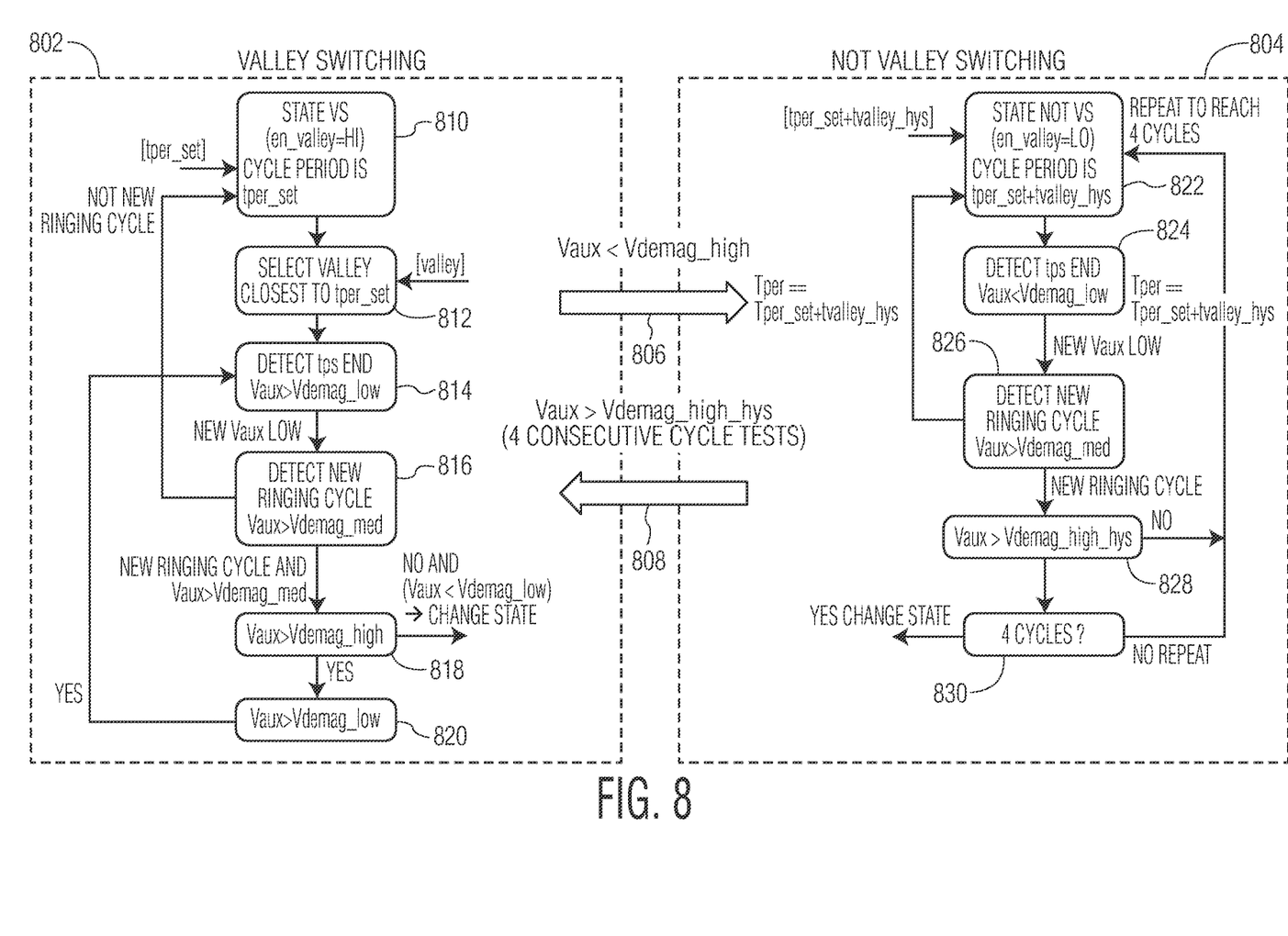
FIG. 8 is a state machine diagram of a valley switching state and a not valley switching state with internal processes within each state.

FIG. 8 is a state machine diagram of a valley switching state and a not valley switching state with internal processes within each state. A controller transitions 806 from a valley switching state 802 to a not valley switching state 804 when a ringing amplitude measure, such as Vaux, falls below an amplitude threshold, such as Vdemag_high. Similarly, the controller transitions 808 from the not valley switching state 804 to the valley switching state 802 when a ringing amplitude measure, such as Vaux, rises below an amplitude threshold, such as Vdemag_high_hys. The two thresholds may be the same or different and there may be multiple tests, such as 4 tests, before a transition is made.

Within the valley switching state 802, processes may be performed such as those shown in FIG. 8. There may be more or fewer operations with more or fewer connections between the operations. The valley switching state at block 810 has a valley enable signal set to high, en_valley=HI. The cycle period is set to a desired cycle period for the desired power, tper_set. Based on the cycle period, the closest valley of the ringing amplitude is selected at 812. An input valley selection, [valley], is provided by e.g., a valley circuit. This selection forms the basis of the selection. The selection is provided to a gate driver which drives the state of the converter to begin a new power phase.

With each new power phase, the controller determines the start of the next cycle. At 814, the end of the actual cycle time, tps, is detected by first determining if the ringing amplitude, as determined through Vaux, or another measure is below the low threshold. If so, then at 816, a new ringing cycle is detected by determining if the ringing amplitude is above the medium threshold. If not, then a new ringing cycle is not detected and the process returns to the initial conditions at 810. The state remains in valley switching. If the ringing amplitude exceeds the medium threshold, then a new ringing cycle is detected. The controller is then ready to test the ringing amplitude for valley switching.

At 818, if the ringing amplitude stays below the high threshold and Vaux<Vdemag_low, then valley switching is disabled. The criteria at 806 are met and the state transitions to the not valley switching state 804. If the ringing amplitude is above the high threshold, then the controller remains in the valley switching state 802.

In the not valley switching state 804, the valley state signal is low, en_valley=LO, at block 822 and the cycle period is extended by an additional amount shown as tvalley_hys. At block 824, the end of the power phase is detected by first determining if the ringing amplitude, e.g., Vaux is less than the low threshold. If so, then second, at 826, the controller determines if the ringing amplitude has exceeded the medium threshold. If not, then the process returns to the initial state 822 and the cycle period stays in the extended time. If there is a new ringing cycle, then at 828, the ringing amplitude is compared to the high threshold. This high threshold may be higher than the high threshold used in the valley switching state. The higher threshold is labeled as Vdemag_high_hys as compared to the lower high threshold of Vdemag_high.

The amplitude is measured all during the ringing phase. When the controller detects a ringing amplitude higher than (Vaux>Vdemag_med) at 806, then there can be three scenarios. In the first scenario, Vaux becomes larger than Vdemag_high_hys at 828. When this is detected, the controller waits through the 4 cycles at 830 or any other suitable number of cycles. The controller may do this by waiting first until Vaux becomes less than Vdemag_low indicating that the amplitude is large enough for valley switching. It then waits for a new ringing cycle at 826 and compares the amplitude to the thresholds again. In the second scenario, Vaux is not greater than Vdemag_high_hys at 828 and then goes to an amplitude less than Vdemag_low at 824. This indicates that the amplitude is too low for valley switching. No further measurements are required until the next ringing cycle because the amplitude is already too low for valley switching and damping effects will only decrease it further. In a third scenario, the converter will switch on due to Tper=Tper_set+tvalley_hys. This takes the state machine from 826 to 822. In this case, no valid measurements have been made. Vdemag_high_hys is not detected at 828, but also Vdemag_low is not detected at 824. In this third scenario, the measurement of the previous oscillation cycle will be used If the ringing amplitude is below the high threshold, then the controller stays in the not valley state 804 and returns to the initial state 822 in the process. If the ringing amplitude is above the high threshold, then controller transitions 808 to the valley switching state 802. In some embodiments, the process returns to the initial state 822 until there are four successive cycle periods at block 830 in which the ringing amplitude exceeds the high threshold. The repeated four cycles provide an additional hysteresis affect. It reduces the number of state changes that might be caused by noise or other short-term effects.

The structures and techniques described herein may be applied to converter operation in DCM in which ringing is prominent in a converter cycle. They may also be applied to BCM in which there the ringing phase is very short but valley switching may still be used to enhance efficiency. They may further be used in applications in which the boost converter is operated in CCM (Critical Conduction Mode. The converter may be a PFC converter, a buck converter, or a Flyback converter. The converter may be capable of operating in different modes and there may be multiple converters of one or more different types operating together. For an interleaved converter, the valley switching controller may operate by sensing a feedback signal from only one of the converters and then enabling or disabling valley switching for both converters using the one feedback signal. Alternatively, valley switching may be applied to each interleaved converter independently of the other two converters.

While embodiments are described in the context of sensing an auxiliary winding voltage as a feedback signal, this feedback signal is used to approximate the drain voltage of the switch in the converter. Accordingly, other parameters of the converter, such as the SnsCur and SnsBoost, identified above, may be sensed to approximate the drain voltage or the drain voltage may be sensed directly and used to determine the ringing voltage amplitude.

A hysteresis function is described in various implementations above. This function provides for different criteria for a transition to valley switching than for a transition from valley switching. A filter may be used to cause the same effect. The difference may be different thresholds, one higher than the other. The difference may be a requirement for multiple repeated tests before a transition is made. The difference may be based on a change in the duration of the cycle period. The difference may also be made to depend on an oscillation frequency of the ringing voltage. The hysteresis function is to reduce the switching between states and can be implemented to avoid repetitive valley enabling and disabling.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. The term "coupled" or similar language may include a direct physical connection or a connection through other intermediate components even when those intermediate components change the form of coupling from source to destination.

The described examples may be implemented on a single integrated circuit, for example in software in a digital signal processor (DSP) as part of a radio frequency integrated circuit (RFIC). The described examples may also be implemented in hardware in a field programmable gate array (FPGA) or application specific integrated circuit (ASIC), or in other electronic devices. The described examples may be implemented in analog circuitry, digital circuitry, or a combination of analog and digital circuitry. Alternatively, the circuit and/or component examples may be implemented as any number of separate integrated circuits or separate devices interconnected with each other in a suitable manner. These examples may alternatively be implemented as soft or code representations of physical circuitry or of logical representations convertible into physical circuitry, such as in a hardware description language of any appropriate.

Boundaries between the above-described operations are provided as examples. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A boost converter control system comprising:
   an amplitude detector to receive an amplitude signal from a boost converter, the amplitude being related to ringing of the boost converter output, the amplitude detector to determine the ringing amplitude;
   a valley switching controller coupled to the amplitude detector to receive the ringing amplitude, compare the ringing amplitude to a first high amplitude threshold when valley switching is enabled and to generate a valley switching disable signal if the ringing amplitude is below the first high amplitude threshold; and
   a cycle controller coupled to the boost converter to generate a drive signal to control switching of the boost converter and coupled to the valley switching controller to receive the valley switching disable signal and to generate the drive signal without valley switching in response to the valley switching disable signal.

2. The boost converter control system of claim 1, wherein the amplitude signal comprises an inductor current of the boost converter and wherein a valley is defined as a moment when the inductor current is zero.

3. The boost converter control system of claim 2, wherein the valley is further defined as a moment a derivative of the inductor current is negative.

4. The boost converter control system of claim 1, wherein the amplitude signal comprises an inductor auxiliary winding voltage of the boost converter and wherein a valley is defined as a minimum of the auxiliary winding voltage.

5. The boost converter control system of claim 1, wherein the amplitude signal comprises an inductor auxiliary winding voltage of the boost converter and wherein a valley is defined as a maximum of the auxiliary winding voltage.

6. The boost converter control system of claim 1, wherein the amplitude signal comprises a voltage of a drain of a switch of the boost converter and wherein a valley is defined as a minimum of the drain voltage.

7. The boost converter control system of claim 1, wherein the cycle controller is further to set a fixed switching period of the drive signal in discontinuous conduction mode in response to receiving the valley switching disable signal.

8. The boost converter control system of claim 1, wherein the valley switching controller is further to compare the ringing amplitude to a second high amplitude when valley switching is disabled and to generate a valley switching enable signal if the ringing amplitude is above the second high amplitude threshold, wherein the second high threshold is higher than the first high threshold, and wherein the cycle controller is to generate the drive signal with valley switching in response to the valley switching enable signal.

9. The boost converter of 8, wherein the valley switching controller is to compare the ringing amplitude to the second high amplitude a fixed number of times and wherein the valley switching circuit is to generate the valley switching enable signal only if the ringing amplitude is above the second high amplitude each of the fixed number of times.

10. The boost converter of claim 1, wherein the valley switching is zero voltage drain switching.

11. The boost converter of claim 1, wherein the valley switching controller is further to determine a period time of the drive signal, compare the period time to a period time threshold and to generate a valley switching disable signal only if the period time exceeds the period time threshold.

12. The boost converter of claim 1, wherein the valley switching controller determines the period time of the drive signal based on the amplitude signal.

13. The boost converter control system of claim 1, wherein the boost converter has a power phase with a primary stroke during which a gate of the converter is enabled and wherein the ringing amplitude is measured after the end of the secondary stroke and before a subsequent primary stroke and wherein a cycle period is related to the time between a primary stroke and a subsequent primary stroke.

14. The boost converter control system of claim 1 wherein the cycle controller is further to generate a second drive signal to control switching of a second boost converter stage and wherein the cycle controller generates the second drive signal without valley switching in response to the valley switching disable signal.

15. The boost converter control system of claim 1, wherein the converter is operating in a discontinuous conduction mode.

16. The boost converter control system of claim 1, wherein the converter is operating in a boundary conduction mode.

17. A power factor correction converter comprising:
a boost converter having a switch coupled to a drive signal, an input, and an output; and
a boost converter control system having an amplitude detector to receive an amplitude signal from the boost converter, the amplitude being related to ringing of the boost converter output, the amplitude detector to determine the ringing amplitude, a valley switching controller coupled to the amplitude detector to receive the ringing amplitude, compare the ringing amplitude to a first high amplitude threshold when valley switching is enabled and to generate a valley switching disable signal if the ringing amplitude is below the first high amplitude threshold, and a cycle controller coupled to the boost converter to generate the drive signal to control switching of the boost converter and coupled to the valley switching controller to receive the valley switching disable signal and to generate the drive signal without valley switching in response to the valley switching disable signal.

18. A method comprising:
receiving an amplitude signal from a boost converter, the amplitude being related to ringing of the boost converter output;
determining the ringing amplitude;
comparing the ringing amplitude to a first high amplitude threshold when valley switching is enabled and generating a valley switching disable signal if the ringing amplitude is below the first high amplitude threshold; and
generating a drive signal to control switching of the boost converter without valley switching in response to the valley switching disable signal.

19. The method of claim 18, further comprising setting a fixed switching period of the drive signal in discontinuous conduction mode in response to receiving the valley switching disable signal.

20. The method of claim 18, further comprising:
comparing the ringing amplitude to a second high amplitude;
generating a valley switching enable signal only if the ringing amplitude is above the second high amplitude; and
generating the drive signal with valley switching in response to the valley switching enable signal.

* * * * *